W. D. FAIRFAX.
SIGNALING APPARATUS FOR VEHICLES.
APPLICATION FILED SEPT. 18, 1917.
1,272,408.
Patented July 16, 1918.
2 SHEETS—SHEET 1.
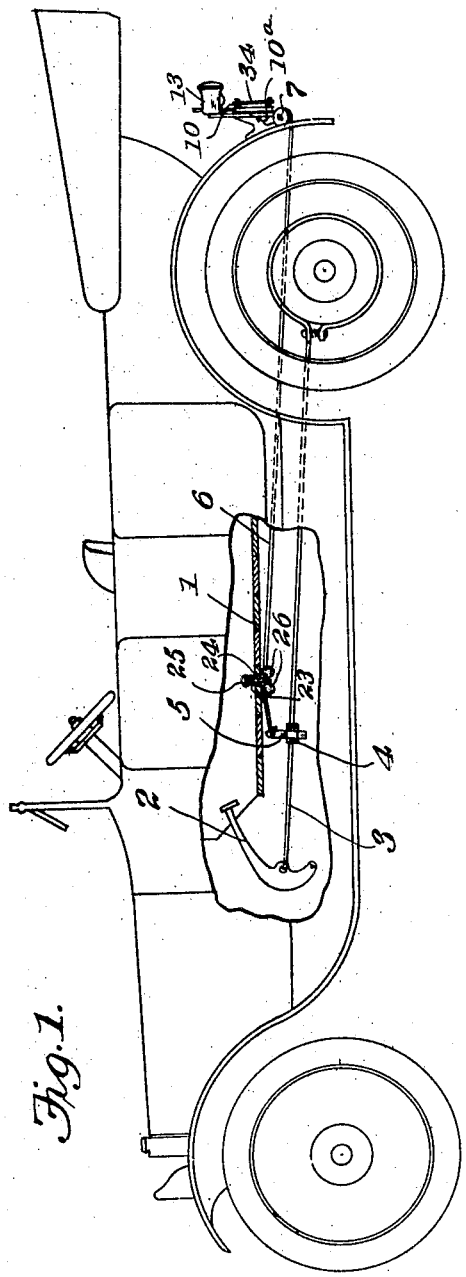
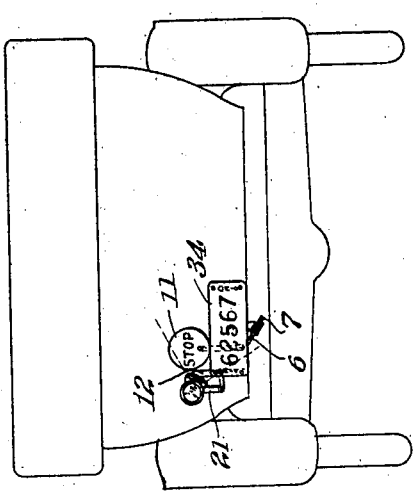
INVENTOR
Walter D. Fairfax,
By F. W. Bond ATTORNEY
WITNESS:
Eugene L. Snyder

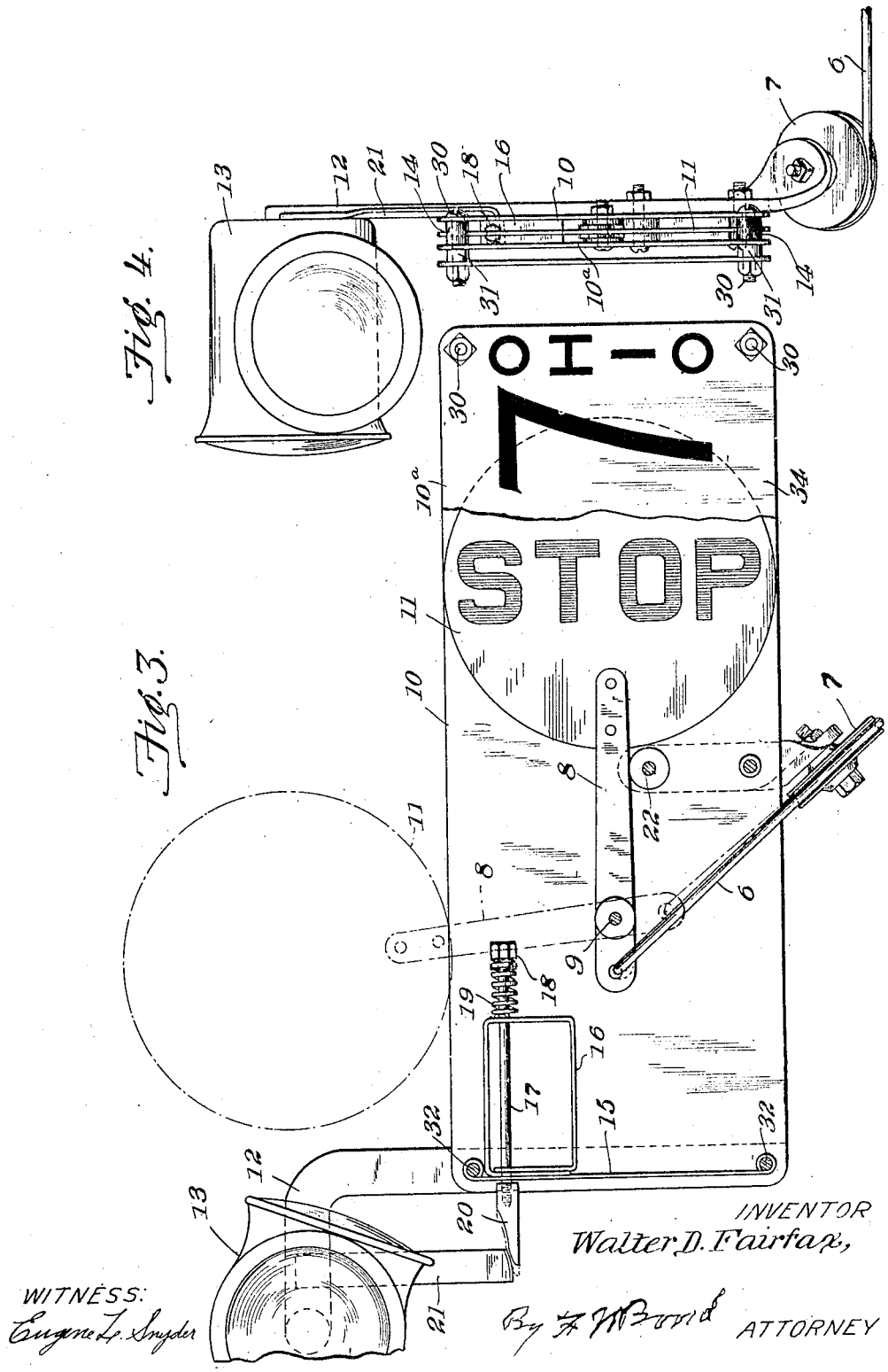

UNITED STATES PATENT OFFICE.

WALTER D. FAIRFAX, OF BREWSTER, OHIO.

SIGNALING APPARATUS FOR VEHICLES.

1,272,408.

Specification of Letters Patent.

Patented July 16, 1918.

Application filed September 18, 1917. Serial No. 192,017.

*To all whom it may concern:*

Be it known that I, WALTER D. FAIRFAX, a citizen of the United States, residing at Brewster, in the county of Stark and State of Ohio, have invented a new and useful Signaling Apparatus for Vehicles, of which the following is a specification.

This invention relates to signal devices for vehicles and has for its object to provide a warning to vehicles approaching the rear of the vehicle carrying said signal.

A further object is to provide a signal adapted to be operated as the brake is applied by the driver of the vehicle.

A still further object is to provide a signal device that will catch the eye at night as well as in the day time, this being attained by a mechanism for illuminating the signal at the time of operation.

In the accompanying drawings:

Figure 1 is a side elevation of an automobile with parts broken away and my improved signal applied thereto.

Fig. 2 is a rear elevation of an automobile showing the preferred location of my device on the rear thereof.

Fig. 3 is a front elevation of the device partly in section with parts broken away.

Fig. 4 is an end view of the same.

Corresponding numerals of reference indicate similar parts in the drawings, in which—

1 represents the floor boards of the ordinary construction, of an automobile and 2 the pedal designed to operate the brake when depressed by the operator. The brake mechanism can be of any well known type, but for purposes of illustration I have shown a brake rod 3 connected at its forward end to the brake operating pedal 2 and to its rear end to a brake of the spring material type which is designed to be closed and brought into engagement with the brake drum on the rear wheels when pressure is exerted upon the operating pedal 2, and to release and spring out of engagement with the brake drum when pressure on the pedal 2 is removed. Secured to the brake rod 3, at a point slightly rearward of the operating pedal 2 is a collar 4 carrying an upwardly projecting arm 5. To the upper end of the said arm 5 is connected the front end of the signal operating cable 6 which passes rearwardly and over a guide pulley 7 located beneath the signal device. The rear end of the said cable is attached to one end of a lever 8 which is pivoted at 9 within the housing plates 10 and 10ª. To the opposite end of the lever 8 is fastened the signal placard 11 on which is located any suitable warning such as the word "Stop." A bracket 12 projects upwardly from one end of the rearmost plate 10 and has mounted thereon and insulated therefrom the ordinary tail lamp 13 carried upon the rear of motor vehicles and the like. This lamp can be of any well known construction, but preferably has an opening pointed rearwardly covered by a red lens, and another opening upon the side next to the signal device covered by a clear glass to allow the bright light from the electric globe to shine upon the signal.

The plates 10 are spaced apart at one end by the spacing collars 14 and at their opposite ends by the strap member 15 on which is carried the bracket 16. Slidably mounted within the bracket 16 and projecting therefrom at either end is a rod 17 having upon its inner end a head 18. A coiled spring 19 is interposed between the head 18 and the bracket 16. Screw threaded upon the opposite end of the shaft 17 is a lug 20 which is adapted to contact with an arm 21 depending from the aforesaid tail lamp, the spring 19 being designed to normally hold the lug out of engagement with the arm 21. The head 18 lies in the same plane as the lever 8 which carries the signal. A bolt 22 having a vulcanized fiber collar is located between the plates 10 and 10ª at a point intermediate the ends of the lever 8 and serves to act as a stop for the said lever when it falls into inoperative position. The spacing collars 14 which serve to space apart the plates 10 are designed to receive bolts 30 which are inserted from the rear of the rear plate 10 through the spacing collars through the front plate 10ª and project a proper distance to receive washers 31. Similar bolts 32 are inserted in the same manner in the opposite end and pass through the strap member 15 located between the plates. The bolts 32 also carry washers and the two bolts 30 and the two bolts 32 are adapted to receive the license tag 34 carried upon the rear of the automobile. Nuts may then be screwed on the threaded projecting ends of the bolts 30 and 32 to hold the license tag 34 in position. It will be noted from Figs. 2 and 3 that the tail lamp 13 is tilted in such a way that the rays of light coming from the side of the lamp next the signal device will fall upon the signal when it is in raised position and will also illuminate the license tag carried on the rear of the signal device.

The lamp 13 is connected in the lighting circuit by the usual means and therefore a very brief explanation is thought sufficient. As is well known the usual practice in wiring the lighting systems of the automobile is to carry a single wire to the lamp and ground the same on the frame-work of the automobile or other metal part which will convey the current to the same. As hereinbefore stated the lamp is insulated from the supporting bracket 12. The arm 21, however, is designed to form a conductor from the lamp to the lug 20, thereby serving to ground the current when the lug 20 and the arm 21 engage.

Referring more specifically to Fig. 1. Mounted upon the floor board and extending therethrough and within easy reach of the heel of the operator is a short rod 24 having a head 25 upon its upper end and a coiled spring 23 inserted between the head 25 and the floor boards of the vehicle to normally hold the rod 24 in raised position. The lower end of said rod 24 is bifurcated and straddles the operating cable 6, suitable rollers 26 carried by a supporting bracket upon the under side of the floor boards, are located on either side of the rod 24 and are adapted to act as guides for the cable 6.

The operation of the signal will be as follows: When the driver desires to stop the vehicle he naturally presses the brake pedal 2 for the purpose of causing the brakes to engage the brake drums upon the rear wheels. As is readily seen the brake rod 3 moves forward when the pedal is depressed, carrying the arm 5 which is secured to it, forward also, thereby exerting a pull upon the cable 6 which in turn exerts a downward pull upon one end of the lever 8 causing the opposite end carrying the placard 11 to rise to substantially a vertical position, elevating the placard 11 above the forward plate 10ª to a position where it will attract the attention and be observed by the driver of any vehicle or vehicles following. The lever 8 will contact with the head 18 upon the rod 17 as it swings into the position to signal, said position being shown in broken lines in Fig. 3, thereby, forcing the rod 17 outward and bringing the lug 20 into engagement with the contact arm 21 upon the lamp, closing the circuit to the electric bulb carried in the lamp, the light from said bulb shining through the opening covered by the clear glass upon the side of the lamp falling upon the placard 11 which has now come to rest. When the driver releases the brake pedal 2 allowing the brake rod 3 to return to normal position the cable 6 is naturally released allowing the placard 11 to drop out of sight between the plates 10 and 10ª.

Should the driver of the vehicle at any time desire to operate the signal without operating the brake on the vehicle he may do so by pressing with his foot upon the head 25 of the rod 24, thereby, forcing the cable 6 downwardly between the rollers 26 and causing a pull to be exerted upon the lever 8 which will raise it in position to signal. The coiled spring inserted between the head 25 and the floor boards will lift the rod 24, thereby, releasing the cable 6 when the foot of the driver is moved from the head 25 of the rod.

In some localities ordinances governing the operation of vehicles require that a light be kept burning on the rear of the vehicle between the hours of sun-set and sun-rise, and in such localities the user of my device may either carry a separate tail lamp to comply with the law or by removing the insulation between the tail lamp and the bracket 12 cause the lamp to burn at all times when the current is thrown into the circuit. The shaft 17 under the tension of the spring 19 serves another purpose than the one hereinbefore pointed out in that the head 18 of the shaft being in engagement with the lever 8 when the same is in raised position will cause the said lever to be forced past vertical center when the pull on the cable 6 is removed and in so doing will allow the lever to fall by gravity to the position shown in full lines Fig. 3.

Although the drawings and above specification, disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claim.

I claim:—

In a signal operating device for vehicles, a foot pedal located through the floor of said vehicle, a spring normally adapted to hold said foot pedal in raised position, a pair of rollers carried by said foot pedal beneath said floor, a flexible cable extending over and engaging said rollers, said cable being secured at one extremity to the brake operating rod of the vehicle, and at the opposite extremity to a pivoted signal arm carried upon said vehicle, the said rollers being arranged to exert a pull upon the said cable when the foot pedal is depressed and to move the signal into exposed position.

In testimony that I claim the above I have hereunto subscribed my name.

WALTER D. FAIRFAX.